United States Patent
Ramakrishnan

(10) Patent No.: US 8,789,119 B2
(45) Date of Patent: Jul. 22, 2014

(54) STATISTICAL REMULTIPLEXER PERFORMANCE FOR VIDEO ON DEMAND APPLICATIONS BY USE OF METADATA

(75) Inventor: Sangeeta Ramakrishnan, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1700 days.

(21) Appl. No.: 10/956,432

(22) Filed: Sep. 30, 2004

(65) Prior Publication Data

US 2006/0067362 A1 Mar. 30, 2006

(51) Int. Cl.
*H04N 7/173* (2011.01)

(52) U.S. Cl.
USPC .............. 725/95; 725/94; 725/96; 370/916

(58) Field of Classification Search
USPC ............. 725/86–104; 370/412–418, 428, 429
See application file for complete search history.

(56) References Cited

U.S. PATENT DOCUMENTS

| | | | | |
|---|---|---|---|---|
| 5,421,031 A * | 5/1995 | De Bey | ........................... | 725/92 |
| 5,530,557 A * | 6/1996 | Asit et al. | ........................ | 725/93 |
| 5,675,732 A * | 10/1997 | Majeti et al. | .................. | 709/235 |
| 5,861,919 A * | 1/1999 | Perkins et al. | ............. | 348/385.1 |
| 6,049,551 A | 4/2000 | Hinderks et al. | | |
| 6,212,201 B1 | 4/2001 | Hinderks et al. | | |
| 6,240,103 B1 * | 5/2001 | Schoenblum et al. | ........ | 370/468 |
| 6,477,707 B1 * | 11/2002 | King et al. | ....................... | 725/97 |
| 6,483,543 B1 | 11/2002 | Zhang et al. | | |
| 6,502,139 B1 * | 12/2002 | Birk et al. | ..................... | 725/101 |
| 6,665,872 B1 * | 12/2003 | Krishnamurthy et al. | ...... | 725/95 |
| 6,681,397 B1 | 1/2004 | Tsai et al. | | |
| 6,704,930 B1 * | 3/2004 | Eldering et al. | ................ | 725/95 |
| 6,751,259 B2 | 6/2004 | Zhang et al. | | |
| 6,795,506 B1 * | 9/2004 | Zhang et al. | ............. | 375/240.26 |
| 6,832,241 B2 * | 12/2004 | Tracton et al. | ................ | 709/203 |
| 6,909,726 B1 * | 6/2005 | Sheeran | ........................ | 370/468 |
| 7,089,577 B1 * | 8/2006 | Rakib et al. | ..................... | 725/93 |
| 7,159,233 B2 * | 1/2007 | Son et al. | ......................... | 725/86 |
| 7,450,609 B2 * | 11/2008 | Liu et al. | ........................ | 370/468 |
| 7,693,188 B2 * | 4/2010 | Robinett et al. | .............. | 370/486 |
| 7,895,629 B1 * | 2/2011 | Shen et al. | ...................... | 725/62 |
| 2001/0004767 A1 * | 6/2001 | Gordon et al. | ................... | 725/87 |
| 2002/0194612 A1 * | 12/2002 | Lundberg et al. | ............. | 725/115 |
| 2003/0043923 A1 * | 3/2003 | Zhang et al. | ............. | 375/240.27 |
| 2004/0025181 A1 * | 2/2004 | Addington et al. | .............. | 725/89 |
| 2004/0172476 A1 * | 9/2004 | Chapweske | .................... | 709/231 |
| 2005/0071882 A1 * | 3/2005 | Rodriguez et al. | .............. | 725/95 |
| 2005/0155080 A1 * | 7/2005 | Zhang et al. | .................... | 725/95 |
| 2006/0253883 A1 * | 11/2006 | Giammaressi | .................. | 725/95 |
| 2009/0282444 A1 * | 11/2009 | Laksono et al. | ................ | 725/89 |

* cited by examiner

*Primary Examiner* — Brian T Pendleton
*Assistant Examiner* — Dika C. Okeke
(74) *Attorney, Agent, or Firm* — Patent Capital Group

(57) ABSTRACT

The present invention improves the performance of video on demand (VOD) in a digital cable system. A statistical remultiplexer (stat mux) acquires metadata that statistically describes the bandwidth characteristics of each VOD channel. When the metadata indicates that the VOD channel will require more bandwidth than is available, the stat mux can re-encode or re-compress other streams or the VOD stream streams to meet the bandwidth limitation. The metadata is generated off-line and streamed out ahead of the VOD program content. The stat mux includes a minimal length buffer for storing VOD program content that when combined with the metadata enables a viewer to randomly access VOD program content without noticeable latency. When a VOD function request is received from the viewer, the previously supplied metadata is used to allocate bandwidth rather than waiting for a look-ahead buffer to acquire a sufficient amount of future VOD program content.

34 Claims, 6 Drawing Sheets

STATISTICAL REMULTIPLEXER PERFORMANCE FOR VIDEO ON DEMAND APPLICATIONS BY USE OF METADATA

BACKGROUND OF THE INVENTION

The present invention relates to digital cable systems and more specifically to a digital cable system having an improved statistical remultiplexer adapted to deliver video on demand with low latency in response to a viewer command.

The increasing popularity of video on demand ("VOD") delivery of cable programming is forcing cable operators to dedicate more bandwidth to meet subscriber demand. This demand poses problems especially for cable operators whose cable systems are operating at a level that is close to the available bandwidth.

Originally, the available bandwidth of a cable system was divided into a limited number of analog channels each having a 6 Mhz bandwidth. Because digital channels take up less bandwidth than the old analog channel, it is now possible to multiplex several digital streams in the bandwidth originally assigned to a single analog channel. In most digital cable systems, the 6 Mhz bandwidth can now carry a multiplexed stream of video data at a rate of about 39 Mb/s or about ten to 12 digital streams to the subscribers' set top box. Digital cable systems have enabled cable providers to offer more channels and other services, such as VOD.

Digital cable systems employ the MPEG2 encoding standard for storing and transmitting audio and video in compressed format in order to transmit the streams in the available bandwidth. Further, most cable systems employ variable bit rate encoding where the bit rate allocated to each stream varies depending on the amount of complexity, such as frame to frame motion or picture details, in the video stream. Variable bit rate encoding means that at different times, different numbers of bits are allocated to the same stream.

In order to multiplex as many channels as possible into a single video stream, cable operators often rely on a technique called statistical multiplexing to ensure that the available bandwidth is efficiently utilized. The statistical multiplexing technique operates on the premise that not all channels will require high bit rates at the same time. Thus, when one channel temporarily needs a high bit rate, some bandwidth is taken from the other channels so that the total bandwidth limit of about 39 Mb/s is not exceeded at any time. With this technique, each digital television channel gets a constantly varying share of the total available bandwidth. In essence, statistical multiplexing is a technique that combines the bit stream representations of several channels into a single bit stream representation, or aggregated output transport stream, that complies with the constraint imposed by the bit rate limitation. Statistical multiplexing is frequently used to pack more broadcast channels onto a single 6 MHz QAM channel. Unfortunately the latency introduced by statistical multiplexing makes it less appealing for VOD applications.

A statistical multiplexer ("stat mux") is a common piece of head-end equipment deployed by cable systems to efficiently utilize the available bandwidth of the cable system. The stat mux does not pre-define the allocation of bandwidth to a given channel. Rather, bandwidth allocation, in prior art devices, is calculated based on the instantaneous needs of each bit stream. Unfortunately, the bandwidth allocation process can result in significant latency because the stat mux must "wait" to look into the future to determine bandwidth requirements for each channel in order to perform intelligent allocation of bandwidth.

The stat mux solves the problem of matching the MPEG2 encoded video streams with the available bandwidth by using intelligent buffering to smooth out peaks of the individual video streams within the aggregated output transport stream. Many stat muxes perform the intelligent buffering by incorporating a look-ahead buffer to dynamically change bandwidth allocation in response to demands from each stream. The look-ahead buffer improves performance because the stat mux has statistical information about the future bandwidth requirements of each stream. Look-ahead buffer schemes work better if the buffer length is increased, but unfortunately increasing the buffer length means that the stat mux must include more memory, will require more processor time and will result in longer delay when re-multiplexing the streams into an aggregated output transport.

Longer buffers have been accepted for broadcast applications because such buffers enable cable operators to multiplex more channels into a single stream. However, long look-ahead buffers introduce a significant problem when cable operators offer VOD programming because the latency caused by the need to empty and re-fill the buffer when, for example, a viewer selects a VOD function request such as pause, rewind or scan forward. There will be considerable delay in responding to VOD function requests, such as pause, rewind or scan forward. This delay, which can range from one to two seconds or more, will be noticeable and annoying to the viewer. Further, if there is a one- or two-second lag before the viewer's function request is recognized, most viewers will be unwilling to utilize VOD and the cable operators will suffer reduced revenues. By limiting the length of the look-ahead buffer, the delay can be decreased but video quality will degrade and the number of channels a cable operator can carry will be limited. Thus, there is great need to minimize the delay that the viewer perceives when watching VOD without degrading the video quality or limiting the number of channels made available to the viewer. What is needed is a stat mux that maintains video quality and channel capacity while minimizing latency when a viewer selects a VOD function. Indeed, there is a great need to make the viewing experience more like watching a movie or other video content recorded on a DVD or a tape cassette.

SUMMARY OF EMBODIMENTS OF THE INVENTION

The present invention seeks to improve the performance of a statistical remultiplexer (stat mux) in a cable distribution system. More specifically, the present invention appends metadata to video on demand (VOD) program content. The metadata describes the bandwidth requirements for the program content. The stat mux uses the metadata to reduce the latency of the stat mux in response to a viewer function request such as to start a program or to pause or fast forward.

In accordance with the present invention, a stat mux dynamically multiplexes a plurality of variable bit rate MPEG2 channels into a single transport stream that has a maximum bandwidth such as, by way of example, about 39 megabits per second (Mb/s). The stat mux varies the portion of the bandwidth allocated to at least one channel based on information provided by metadata associated with the channel. The metadata describes the bandwidth requirements for each channel so that bandwidth can be calculated ahead of time thereby eliminating the wait associated with filling the look-ahead buffer. More specifically, the metadata provides a summary of future key performance parameters so that the stat mux can efficiently allocate bandwidth and minimize latency when responding to VOD function requests. By way of example, when the metadata indicates that the channel will require more bandwidth than is available, the stat mux will re-encode or re-compress one or more streams to meet the bandwidth limitation. Without advance notice via metadata, the stat mux would either be taken by surprise by the sudden increase in bandwidth requirement, resulting poorer bandwidth allocation or, alternatively, it would need a large look-ahead buffer in order to be forewarned of the upcoming increased bandwidth requirements to allow it to do better bandwidth allocation.

The present invention is readily adapted to network personal video recorders and other applications that involve the playback of previously recorded bit streams. By pre-characterizing the bit streams and saving the statistics as metadata, it is possible to improve the response of the stat mux without increasing the latency or unduly loading the processor. These and other features as well as advantages that categorize the present invention will be apparent from a reading of the following detailed description and review of the associated drawings.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
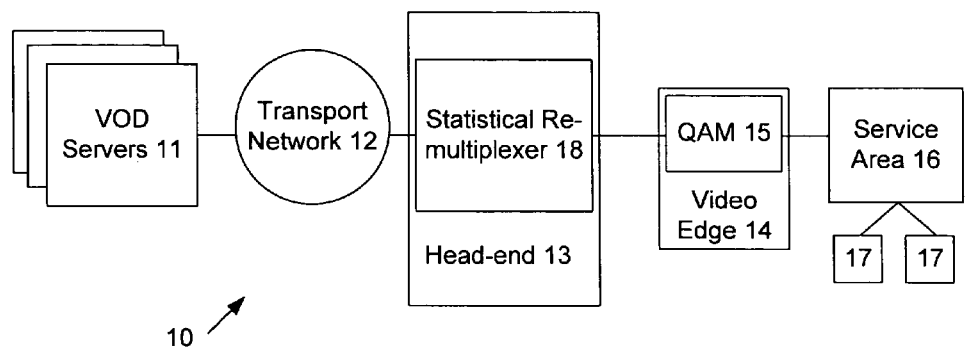
FIG. 1 is a simplified block diagram illustrating one exemplary embodiment of a digital video network in accordance with an embodiment of the present invention.

Referring now to the drawings more particularly by reference numbers, a simplified schematic block diagram of a representative digital video network (DVN) 10 is illustrated in FIG. 1. DVN 10 typically comprises a series of network components 11, 12, 13, 14, 15, 16, 17 and 18, each block in the schematic block diagram representing a different portion of DVN network 10. In addition, each component logically represents conventional subsystems for performing a particular set of functions or tasks. The operation of each component in performing each of the functions or tasks may be performed by software executing on a computer, by hardwired logic devices or a combination of both.

In response to a subscriber selection, one of the VOD servers 11 will send a digital program stream through a transport network 12 to head-end 13 of cable system 10. Transport network 12 may be either a satellite-based network, an optical terrestrial-based network or other high-speed network. In addition to program content, VOD servers 12 also transmit metadata that describes the statistical characterization of the bandwidth required by the program content. This metadata is used to minimize latency in delivering the program content and is not provided to the subscriber. The metadata that describes the bandwidth requirement is fundamentally different from subscriber metadata that is intended for delivery to the set-top box of subscribers 17. As used herein, metadata refers to bandwidth information that is used by DVN 10 components to deliver the transport stream to the subscriber and, in particular, to minimize latency associated with the delivery of the program. In contrast, subscriber metadata refers to information that is intended for delivery to the subscriber to enhance the viewing options associated with a particular program. Subscriber metadata includes information that a viewer may access such as a menu that provides available program content, names of the actors, directors and writers, different audio tracks for the program and the like.

The transport stream as sent from video servers 11 may need to be "groomed." Grooming means that the head end 13 selectively adapts the bit streams that make up the transport stream to make a channel lineup customized for each head-end in the cable operator's system. Once the grooming process is complete, head-end 13 distributes the transport stream to a plurality of hub networks, such as video edge network 14.

Video edge network 14 includes a quadrature amplitude modulation (QAM) device 15 that acts as a IP-to-MPEG-2 gateway between a gigabit Ethernet transport network and the cable network. QAM device 15 accepts MPEG-2 single-program transport streams (SPTSs) that are then processed and remultiplexed into MPEG-2 multiprogram transport streams (MPTS). The MPEG-2 MPTS are then routed for distribution. Each video edge network 14 is dedicated to transporting the program content and VOD throughout a neighborhood service area, such as service areas 16. Each service area 16 further comprises a plurality of individual subscribers 17.

DVN 10 enables cable operators to deliver unicast program content to subscribers 17 such as VOD, where subscribers may select content from a menu of available programming for viewing at a time of their choosing. With VOD, subscribers in a service area 16 may select the make up of the program content delivered to their television.

To meet subscriber demand for VOD programming, cable operators often include a statistical remultiplexer ("stat mux") 18 to improve the network's utilization of available bandwidth. However, rather than utilize a large look-ahead buffer, which introduces a considerable delay in responding to VOD function requests from a viewer, stat mux 18 utilizes the metadata to determine how to allocate bandwidth. Thus, rather than incurring a noticeable delay that may range from one to two seconds or more associated with filling a large look-ahead buffer, stat mux 18 can rapidly determine bandwidth requirements on the fly. When a viewer makes a function request, there will be minimal latency for stat mux 18 to respond. Specifically, if a viewer attempts to rewind or fast forward the program, the system response is not unduly delayed because of the need to dump the contents of the look ahead buffer and then wait for the buffer to re-fill with the new content selected by the viewer.

Figure 2:
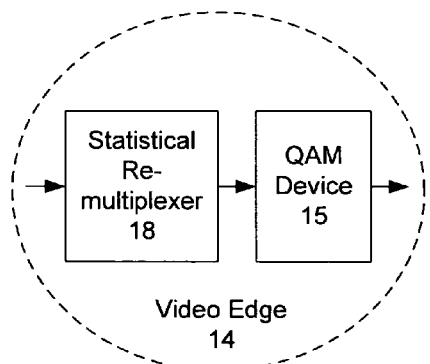
FIG. 2 illustrates an alternative configuration of a portion of the digital video network shown in FIG. 1.

FIG. 2 illustrates an alternative configuration of a portion of DCN 10. Specifically, rather than perform the statistical remultiplexing at head-end 13, stat mux 18 is positioned proximate to QAM device 15 at the video edge 14. Stat mux 18 is a MPEG multiplexing device that assists cable operators to create customized digital program lineups in a given shared bandwidth. Stat mux 18 takes in multiple program transport streams (MPTS) or single program transport streams (SPTS) as inputs and provides a specific multiplexed cable package as an output by varying the bandwidth allocated to each channel. Further, stat mux 18 can also edit the original MPEG channels to alter the bit rates so that the total bit rate will still be less than or equal to the maximum bit rate. The output of stat mux 18 is exported to QAM device 15 for distribution to the set top box of each subscriber 17.

To remain compatible with analog cable systems, it is necessary that the transport stream comprise multiple multiplexed digital streams in a single channel. In the United States, each channel (that is, a 256 QAM channel) has a 6 Mhz bandwidth, while in Europe, each channel has an 8 Mhz bandwidth. Cable operators use variable bit rate encoding for the video streams so the multiplexing operation becomes complicated and there may be short periods of time where several channels will simultaneously require a high percentage of the available bandwidth. Variable bit-rate encoding means that at different times, different numbers of bits are allocated to each stream with more bits being required to encode a stream when there is a lot of frame-to-frame motion and fewer bits when frame-to-frame images are static.

The multiplexed video streams are combined by stat mux 24 into an MPEG transport stream that is delivered to subscribers 17. Stat mux 24 optimizes the MPEG transport stream by using the metadata to smooth out peaks of each VOD channel within the multiplexed transport stream. In instances where the rate of the individual channels peak simultaneously, such as at the beginning of a commercial or station break, the stat mux 24 may employ a bit-rate-reduction algorithm to limit the amount of each stream re-multiplexed into the MPEG transport stream. However, when a VOD function request, such as scan forward request, is received from a viewer, the present invention avoids the need to empty and then wait for the look-ahead buffer of the stat mux to be refilled with the requested program content. By using metadata to determine bandwidth requirements, the latency associated with managing the look-ahead buffer is eliminated.

For broadcast applications, latency is not a critical issue because there is no reference point to determine if the program content has been delayed. However, for VOD applications, the viewer can start a selected program and it is expected that the program will start almost immediately. Latency is also a problem when the viewer attempts to pause a VOD program and then restart or if the viewer desires to rewind and then replay a section of the program content. If there is a delay of several seconds, the viewer will be dissatisfied with VOD. When there is a substantial delay, it degrades the viewing experience and the viewer may decide to use alternative viewing choices, such as DVD recorded content, that have lower latency. For this reason, the present invention minimizes the latency associated with VOD and other program content by detecting bandwidth demand peaks ahead of time and adjusting the content to match available bandwidth without waiting several seconds for a look-ahead buffer to be refilled.

Figure 3:
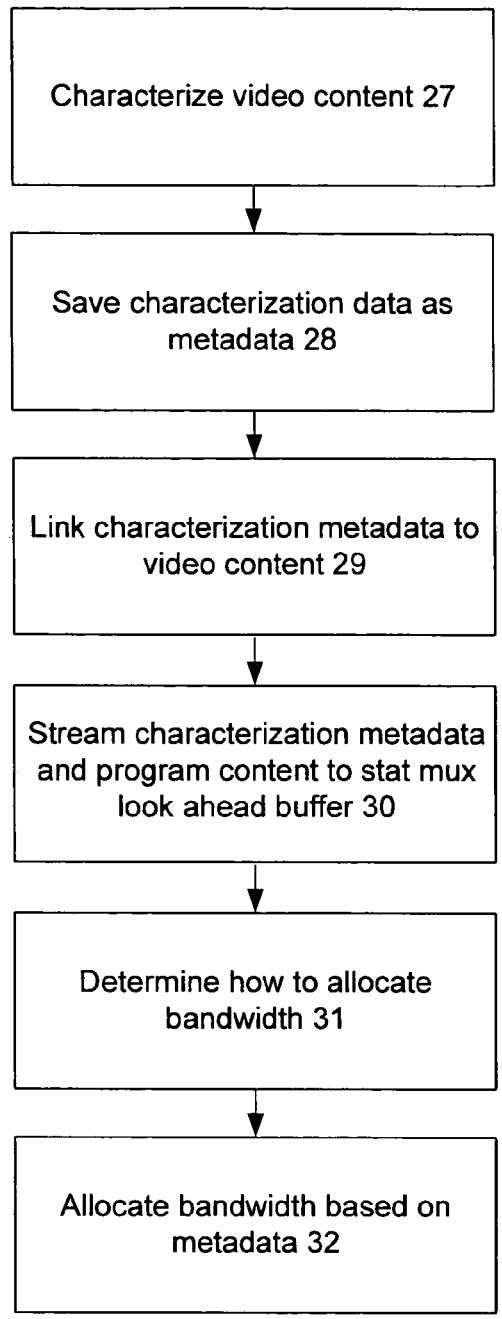
FIG. 3 shows a flow diagram in accordance with an embodiment of the present invention.

The flow diagram shown in FIG. 3 illustrates one preferred latency reduction process for VOD in accordance with one embodiment of the present invention. Since VOD program content is typically a movie or similar recorded program, it is possible for a program aggregator to characterize the content and extract bandwidth statistics as indicated at step 27. During the characterization process, each frame is analyzed to determine the amount of relative motion compared to the preceding frame and the subsequent frame. The characterization data may also include frame size, type of picture, quantizer levels, picture complexity and similar video traits that will impact bandwidth statistics. Once the content is characterized, the characterization data is stored as metadata as indicated at step 28. This metadata is preferably stored on VOD server 11 together with the content. Advantageously, since VOD content does not change, the characterization process to recover the bandwidth statistics is performed once, stored and then used multiple times. The metadata is linked to the video content as indicated at step 29 so that stat mux 18 may quickly ascertain bandwidth requirements of the program content. Because VOD content is stored in MPEG2 format, the metadata may be streamed as part of the private data stream associated with the program content as indicated at step 30.

Figure 4A:
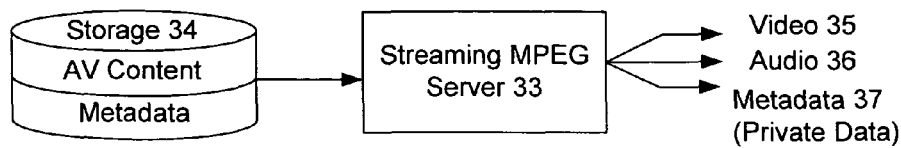
FIGS. 4A, 4B and 4C illustrate the streaming of encoded program content and metadata in accordance with various embodiments of the present invention.
Figure 4B:
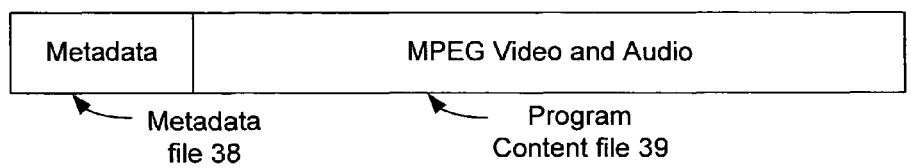
Figure 4C:
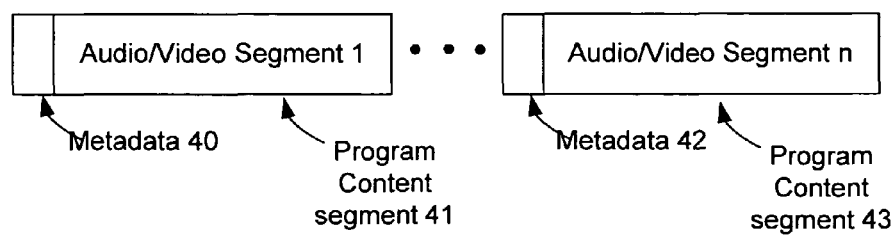

As illustrated in FIG. 4A, an MPEG streaming device 33 can stream MPEG encoded program content from a storage device 34 comprising a compressed video stream 35, a compressed audio stream 36, and a private data stream 37, which includes the metadata for determining bandwidth requirements. Private data stream 37 is streamed as a MPEG private user stream type within the program. In other embodiments, such as is illustrated in FIG. 4B, metadata is streamed as a separate metadata file 38 ahead of program content file 39 comprising the MPEG encoded video and audio streams. Metadata from metadata file 38 links with the program content by using timing information generated by the MPEG encoding process, such as a program clock reference stamp or the decoding time stamp (DTS). In yet another embodiment as illustrated in FIG. 4C, metadata is transmitted ahead of a program content segment. Specifically, metadata 40 is transmitted in conjunction with program content segment 41 and describes the statistical information of the related video and audio stream. Similarly, metadata 42 is transmitted in conjunction with program content segment 43 and describes the related streams. Further, the statistical information is concise and requires very little bandwidth compared to the video stream. With appropriate provisioning in the network, the metadata can be transmitted without imposing any delays in the program content.

Refer again to FIG. 3. At the stat mux, the streamed metadata is analyzed to determine if the required bandwidth allocation for the related stream will exceed the actual available bandwidth. In some cases, such as when multiple channels have simultaneous peak bandwidth demands, it may be necessary to decode one or more of the input MPEG streams to obtain program content and then re-encode the program content into an output MPEG stream. In this manner, it may be possible to reduce the bandwidth requirements for that channel. Although described in terms of a decode/encode functionality, one skilled in the art will recognize that the decoder/encoder block can be replaced by a transrating or transcoding module. Although, the MPEG decode and encode process is computationally intensive, the metadata provides advanced knowledge of the need to re-encode. Due to MPEG allowing a wide range of decoder buffer fullness, the stat mux can delay or smooth a bit rate peak by delaying the transmission of one or more frames, within selected bounds, such that the decoder buffer does not under-run. The intelligence to determine how to adjust the peak demand to match the available bandwidth is indicated at step 31. Once the bandwidth allocation is determined, the stat mux then allocates the bandwidth upon the arrival of the video and audio content. By streaming the metadata ahead of time, the latency is minimized because the stat mux can readily determine if one or more channels' bits can be delayed to a time where bandwidth requirements are below capacity. In this manner the stat mux can avoid unnecessarily re-encoding one or more channels. It should be noted that delaying bits does not translate to delay in the display of frames to the user. The delay introduced by the stat mux refers only to when bits are transferred to the decoder buffer. By adjusting the decoder buffer levels within MPEG defined bounds, the statmux can delay or advance the bits as sent to the QAM.

Figure 5:
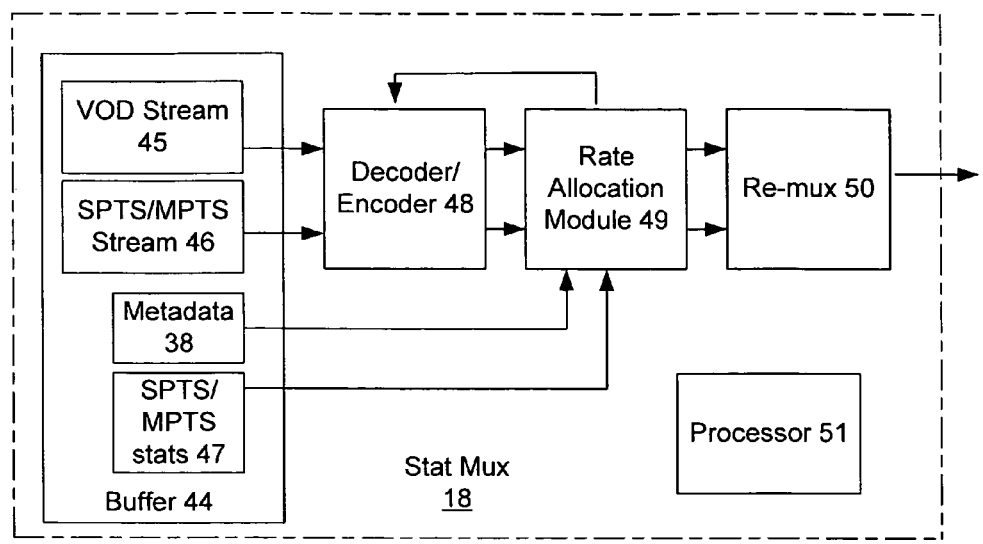
FIG. 5 illustrates a statistical remultiplexer (stat mux) in accordance with an embodiment of the present invention.

FIG. 5 illustrates one embodiment of stat mux 18 having a buffer for storing a VOD stream 45 with corresponding metadata 38 and several seconds of SPTS and MPTS streams 46 that do not have associated metadata. In the preferred embodiment, the buffer for storing the VOD stream 45 is comparatively small with respect to the buffer storage requirements for streams 46. Stat mux 18 generates bandwidth allocation statistics for streams 46 by filling buffer 44 and calculating statistics. However, for VOD stream 45, metadata file 38 is previously stored in buffer 44 so there is no need to collect several seconds of program content before determining future bandwidth requirements. For example, in one preferred embodiment, only a single frame of stream 45 is stored in buffer 44 while one to four seconds of frames from streams 46 are stored in buffer 44. Stat mux 18 uses the buffered streams to generate statistical information about the future bandwidth requirements of each stream. Using the statistics available from metadata file 38 and the generated statistics for the SPTS and MPTS streams 46, rate allocation module 49 determines the bandwidth requirements and determines whether one or more of the streams 46 will be re-encoded by decoder/encoder 48 at a lower bit rate. Once the encoding process is complete, streams 45 and 46 are re-multiplexed as an output transport stream by re-mux 50. Operation of stat mux 18 is controlled by a processor 51.

It will be appreciated that if VOD stream 45 is interrupted by a VOD function request such that non-sequential video and audio content is received, metadata 38 is accessed to determine the future bandwidth requirements without having to wait for the new content to be buffered and the statistics calculated. Stat mux 18 receives from VOD server 11 the VOD program stream in a non-linear viewing sequence, stat mux 18 adapted to allocate bandwidth for the non-linear viewing sequence in response to a VOD function request.

Figure 6:
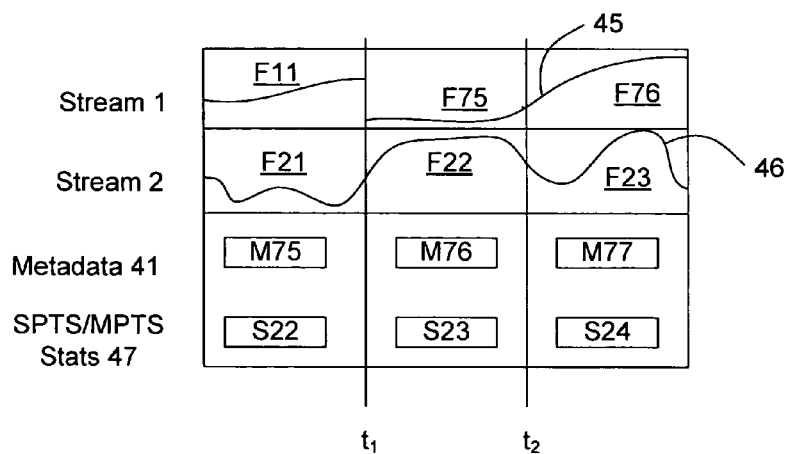
FIG. 6 illustrates the time domain bandwidth requirements for two digital streams of program content and the corresponding metadata in accordance with an embodiment of the present invention.

FIG. 6 illustrates the contents of buffer 44 over a short time period. Buffer 38 receives and stores digital program streams 45 and 46. As illustrated, two program streams are shown to simplify the description although it will be appreciated that buffer 44 may include a plurality of program streams and may typically include about ten to fifteen program streams. Metadata file 38 is associated with stream 45 and SPTS/MPTS stats 47 are associated with stream 46. During the time preceding $t_1$, a VOD function request to scan forward from frame 11 to frame 75 is received. Rather than waiting for several seconds of frames, beginning with frame 75, to load into the buffer, calculating the statistics and then determining the bandwidth allocation, stat mux 18 simply accesses the metadata associated with frame 75 and continues calculating bandwidth requirements. Thus, even though stream 46 has a high bandwidth requirement between time $t_1$ and $t_2$, stat mux is able to determine that there will be no need to reduce the bit rate of either streams 45 or 46 because metadata M75 indicates that frame 75 does not have a high bandwidth requirement in that time period. Thus, rather than gather statistics regarding the bit rate of each bit stream in real time, the present invention utilizes metadata file 38 to indicate bandwidth requirements of the VOD stream thereby reducing system latency and increasing viewer enjoyment.

The metadata file 38 provides the statistics that enable allocation module 43 to arbitrate the amount of bandwidth to allocate to each stream. If the combined bit rate is too high, the allocation module 43 may cause one or more streams to be decoded and re-encoded by decoder/encoder 44 to reduce the bit rate. After the bandwidth has been allocated and one or more streams, if any, have been re-encoded, re-multiplexer 50 recombines the streams.

The use of metadata to determine bandwidth allocation eliminates the need to look-ahead in order to gather statistics about future program content. This feature significantly reduces system latency or delay associated with viewing a VOD program. In contrast to subscriber metadata that is transmitted to the set top box, the metadata that describes the bandwidth requirement is stripped out at the head-end or the video edge distribution hub and it is not sent on to the subscriber. Advantageously, the length of buffer 44 can be significantly reduced because the metadata eliminates the need to buffer VOD program content. For example, it is possible to limit the buffer length for storing VOD program content to about one to ten frames, by way of example rather than two or three seconds as was required in the prior art. This advantage arises because it is not necessary to look ahead into the VOD stream to calculate the bandwidth statistics in real time.

The metadata uses time codes to identify the video frames to which it relates although other mechanisms can be used in alternative embodiments to synchronize the metadata to the program content. For example, the metadata could describe the bandwidth requirements between two specific time codes. In an alternative embodiment, the metadata relates to specific frames. In this embodiment, the metadata may include a specific decoding time stamp that indicates the frame or frames that will arrive at the stat mux at some future time with high bandwidth. The metadata would describe the size of the identified frame or frames, the quantization level and other relevant statistical data. Advantageously, by using the DTS to identify the specific time code where the high bandwidth requirements will occur, there is no need for a large look-ahead buffer.

Figure 7:
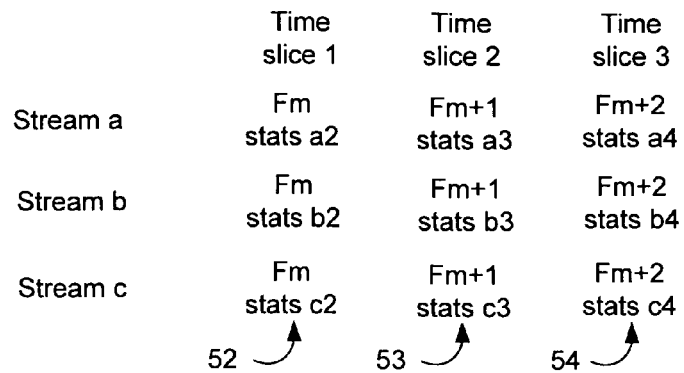
FIG. 7 illustrates a buffer in the stat mux for storing metadata in accordance with an embodiment of the present invention.

FIG. 7 illustrates the metadata 38 portion of buffer 44. Here metadata includes a sequence of three groups of frames of video content from three different streams with each group of frames identified with the reference indicator, Fm, Fm+1 and Fm+2. The metadata provides bandwidth statistics and other information to the stat mux to adjust bandwidth allocation in a future time slice so the metadata associated with each frame must be provided to the stat mux prior to arrival of the associated frame at the stat mux. Thus, the metadata (that is, statsa2, statsb2 and statsc2) for each of the frame groups Fm+1 associated with stream a, stream b and stream c is provided at time slice 1, as indicated at 52. Then, the frame group Fm+1 for each stream will appear at the stat mux during time slice 2, as indicated at 53. With the advanced notice of bandwidth demands for each stream, the stat mux can adjust the bandwidth requirement with minimal buffering. Likewise, the frame group Fm+2 will appear at the stat mux during time slice 3, as indicated at 54, and the metadata, denoted as stata2, statb2 and statc2, will appear at the stat mux as indicated at 53. Using this advanced notice, the allocation module 49 (FIG. 5) receives, during time slice 1, an indication that there may be insufficient bandwidth at future time slice 2. In operation, processor 51 may direct decoder encoder 48 to compress one or more streams in an effort to reduce bandwidth prior to delivering content to allocation module 44. Once the bandwidth allocation is complete, re-mux 50 combines the plurality of streams into a transport stream for delivery to the service areas 16 (see FIG. 1).

Advantageously, the statistics included in the metadata may include an indicator to provide processor 51 with additional information regarding an estimated amount of bandwidth that may be obtained from decoding and re-encoding the stream. For example, if the information may be a flag that indicates that stream b has been designated as a low value stream (such as if a cable system is merely streaming promotion advertisements for available VOD content), processor may need to only compress stream b to reduce the bandwidth. If bandwidth limits are still being exceeded, the processor may direct decoder/encoder 48 to compress stream a and stream c. In this manner, stat mux 18 is provided an eaerly indication that one or more streams may be readily compressed in comparison to other streams.

Since processor 51 is able to view the statistics of future bandwidth requirements, it may better plan on bandwidth allocations for future time slices. With the metadata for each channel available ahead of time, the processor may determine bandwidth allocation based on available statistics. Rather than compile the statistics in real time for each stream, the processor may merely review the contents of the buffer and pipeline compression of program content to eliminate latency. Further, VOD and cable quality is improved since the stat mux is better able to determine whether one or more streams can be allocated less bandwidth than other streams based on statistical information. With the statistical information, the look ahead buffer can be much smaller than in prior systems thereby improving the response time.

Figure 8:
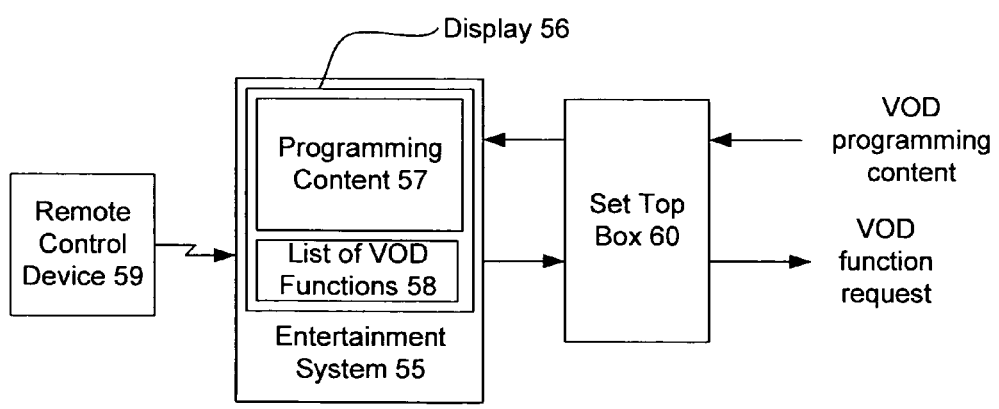
FIG. 8 illustrates a subscriber location in accordance with an embodiment of the present invention.

FIG. 8 further illustrates DVN 10 from the perspective of a viewer accessing VOD program content at a subscriber 17. The viewer accesses VOD program content through an entertainment system 55 such as a television or stereo system. Typically, entertainment system 55 includes a display 56 on which is displayed the program content 57 in at least a portion of display 56 and on which is displayed the available VOD functions 58. When the viewer desires to access one of the VOD functions 58 to control the presentation of program content, a remote control device 59 may be used to select the desired function. A cable set top box 60 detects the selection and transmits it to a video source 61. In this manner, the viewer may initiate play of the VOD content, pause it, rewind or advance to a different portion of the content. Transmission of the VOD content is delivered with low latency because the metadata is used to allocate the necessary bandwidth in a timely manner.

Figure 9:
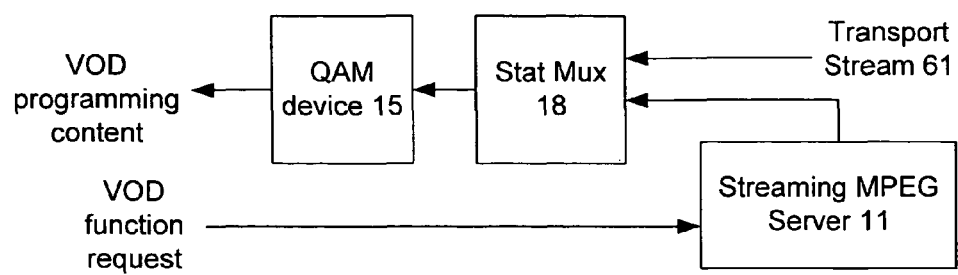
FIG. 9 further illustrates the relationship of the program source and the statistical remultiplexer in response to a VOD function request from a viewer located at one of the subscriber locations in accordance with one embodiment of the present invention.

As illustrated in FIG. 9, when the set top box 60 detects a VOD function request, it is transmitted to the program source, such as VOD servers 11, so that the selected portion of the content can be streamed. Servers 11 may be located at the program originator, at the head end or at the video edge. The stat mux 18 combines the newly selected program content with transport stream 61 for delivery to the subscriber via QAM device 15. Since the stat mux does not have a long look-ahead buffer, the necessary program content is retrieved with no apparent latency to the viewer.

Although the invention has been described with respect to specific embodiments thereof, these embodiments are merely illustrative, and not restrictive of the invention. While not all devices typically found in a cable system are shown, it is to be understood that other devices, such as routers, switches, servers and the like may also be part of the cable system. Further, it is to be understood that the present invention may be used in other types of stored network environments capable of delivering near real-time delivery of video. For example, the present invention enables network personal video recorders to display video content responsive to a viewer request without undue delay.

Further, although the stat mux may implement the entire invention in hardware, portion of the logic will include executable code executed by processor 51 and other processors that comprise decoder/encoder 48, allocation module 49 and/or re-mux 50. The executable code described herein may be implemented in any suitable programming language to implement the routines of the present invention including C, C++, Java, assembly language, etc. Different programming techniques can be employed such as procedural or object oriented. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein "metadata" for purposes of embodiments of the present invention may be any information, computer code or digital information that can communicate, describe, indicate or otherwise provide a representation of the program content to be received by the stat mux in a future time period. The metadata can be, by way of example only but not by limitation, any electronic information that describes the content of the stream and is used by the stat mux primarily to allocate bandwidth from the head-end to the subscribers. The metadata is generated by the aggregator or other program content provider and is to be contrasted to "viewer metadata" that is delivered to the subscribers' set top box as part of the program content. As will be appreciated, viewer metadata is information such as the author of the program, the actors, the availability of different camera angles or other features of the program content that was generated with the intent that the viewer will access the viewer metadata while viewing the VOD program.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A statistical remultiplexer, comprising:
a buffer for storing metadata associated with a stream of video on demand (VOD) program content, wherein the metadata is linked to at least one time code in the stream of VOD program content, wherein the metadata is different than subscriber metadata in the stream of VOD program content and the metadata is removed from the stream of VOD program content at a video edge distribution hub, wherein the statistical remultiplexer is configured to multiplex a plurality of variable bit rate channels into a single transport stream having a maximum bandwidth, the statistical remultiplexer being further configured to vary a portion of the maximum bandwidth allocated to a particular one of the channels based on information provided by the metadata associated with the stream of VOD program content, wherein the buffer stores ten or less frames of the VOD program content, wherein the metadata is received from a source of the VOD program content with the stream of VOD program content and the metadata provides a summary of future performance parameters for specific channels such that the statistical remultiplexer allocates future bandwidth in response to a video on demand function request, wherein the statistical remultiplexer is configured to receive the VOD program content in a nonlinear viewing sequence, the statistical remultiplexer being adapted to utilize the metadata to determine bandwidth allocation for the non-linear viewing sequence such that system latency is less than about one second in response to a VOD function request, and wherein the statistical remultiplexer is configured to re-encode a particular stream to meet a future bandwidth limitation.

2. The statistical remultiplexer of claim 1, wherein the metadata comprises a plurality of statistical descriptions, each statistical description relating to a portion of the stream of VOD program content.

3. A cable system for delivering video on demand (VOD) programs, the cable system comprising:
a statistical remultiplexer having a look ahead buffer for receiving a plurality of program streams and a buffer for receiving at least one VOD program stream from a VOD program stream source, wherein the buffer stores one frame of the VOD program stream, the VOD program stream including metadata that originated from the VOD program stream source, wherein the metadata is different than subscriber metadata in the stream of VOD program content and the metadata is removed from the stream of VOD program content at a video edge distribution hub, the metadata describing the bandwidth requirements of the at least one VOD program stream, the statistical remultiplexer being configured to:
multiplex a plurality of variable bit rate channels into a single transport stream having a maximum bandwidth;
vary a portion of the maximum bandwidth allocated to a particular one of the channels based on information provided by the metadata associated with the particular channel, wherein the metadata provides a summary of future performance parameters for specific channels such that the statistical remultiplexer allocates future bandwidth in response to a video on demand function request; and
re-encode a particular stream to meet a future bandwidth limitation;

a VOD server, coupled to the statistical remultiplexer, for providing the at least one VOD program stream and the metadata to the statistical remultiplexer; and a cable distribution system for distributing the plurality of program streams and the at least one VOD program stream from the VOD server to the statistical remultiplexer and for distributing the remultiplexed streams to the subscriber.

4. The system of claim 3, wherein the statistical remultiplexer is configured to receive from the VOD server the VOD program stream in a nonlinear viewing sequence, the statistical remultiplexer being adapted to allocate bandwidth for the non-linear viewing sequence in response to a VOD function request.

5. The system of claim 4, wherein the statistical remultiplexer utilizes the metadata to determine bandwidth allocation for the non-linear viewing sequence such that system latency is less than about one second in response to the VOD function request.

6. The system of claim 5, wherein the metadata comprises statistical information relating to a plurality of portions of the VOD program stream.

7. The system of claim 6, wherein the metadata comprises information that is linked to a second portion of the VOD program stream.

8. The system of claim 7, wherein the metadata is linked to at least one time code in the VOD program stream.

9. A cable system for delivering video on demand (VOD) program content to a subscriber, the cable system comprising:
a source of VOD program content;
a set top box at a subscriber's location that receives VOD program content from the source and that sends a VOD function request that controls presentation of the VOD program content to the source;
a statistical remultiplexer, coupled to the source, the statistical remultiplexer being configured to:
allocate bandwidth to a first portion of the VOD program content;
receive metadata from the source of the VOD program content, the metadata associated with the VOD program content, wherein the metadata is linked to at least one time code in the VOD program content, wherein the metadata is different than subscriber metadata in the stream of VOD program content and the metadata is removed from the stream of VOD program content at a video edge distribution hub, wherein the statistical remultiplexer is configured to receive the VOD program content in a nonlinear viewing sequence, the statistical remultiplexer being adapted to utilize the metadata to determine bandwidth allocation for the non-linear viewing sequence such that system latency is less than about one second in response to the VOD function request;
multiplex a plurality of variable bit rate channels into a single transport stream having a maximum bandwidth;
vary a portion of the maximum bandwidth allocated to a particular one of the channels based on information provided by the metadata associated with the particular channel, wherein the metadata provides a summary of future performance parameters for specific channels such that the statistical remultiplexer allocates future bandwidth in response to the VOD function request;
store ten or less frames of the VOD program content in a buffer; and re-encode a particular stream to meet a future bandwidth limitation.

10. The system of claim 9, wherein the metadata includes links to the VOD program content.

11. The system of claim 9, wherein the statistical remultiplexer is adapted to receive a plurality of program streams each stream having associated metadata that is used by the statistical remultiplexer to determine the allocation of bandwidth to each of the plurality of program streams.

12. The system of claim 9, wherein the metadata is transferred to the statistical remultiplexer with the VOD program content.

13. A method for minimizing latency in a video on demand (VOD) cable system, the method comprising:
receiving, at a statistical remultiplexer, metadata for VOD program content before receiving the VOD program content, wherein the metadata is linked to at least one time code in the stream of VOD program content, wherein the metadata for the VOD program content was determined at the source of the VOD program content, and wherein the metadata is different than subscriber metadata in the stream of VOD program content and the metadata is removed from the stream of VOD program content at a video edge distribution hub, wherein the statistical remultiplexer is configured to receive the VOD program content in a nonlinear viewing sequence, the statistical remultiplexer being adapted to utilize the metadata to determine bandwidth allocation for the non-linear viewing sequence;
storing ten or less frames of the VOD content in a buffer;
determining bandwidth requirements for a first portion of the VOD program content for a future period of time in response to the metadata;
multiplexing a plurality of variable bit rate channels into a single transport stream having a maximum bandwidth; and
varying a portion of the maximum bandwidth allocated to a particular one of the channels based on information provided by the metadata associated with the particular channel, wherein the metadata provides a summary of future performance parameters for specific channels such that the statistical remultiplexer allocates future bandwidth in response to a video on demand function request, and wherein the statistical remultiplexer is configured to re-encode a particular stream to meet a future bandwidth limitation.

14. The method of claim 13, further comprising receiving a VOD function request from a subscriber and responding to the request in less than about 1.0 second.

15. The method of claim 13, further comprising receiving a request from a subscriber and using the metadata to minimize the latency of the statistical remultiplexer in responding to the request.

16. The method of claim 13, wherein the statistical remultiplexer alters the bit rates of the program stream in response to the metadata.

17. A method, comprising:
storing ten or less frames of a first portion of one of a plurality of streams of program content, the first portion linked to a first portion of metadata, wherein the metadata originated from a source of the program content, wherein the metadata is different than subscriber metadata in the stream of VOD program content and the metadata is removed from the stream of VOD program content at a video edge distribution hub;
multiplexing a plurality of variable bit rate channels into a single transport stream having a maximum bandwidth;

varying a portion of the maximum bandwidth allocated to a particular one of the channels based on information provided by the metadata associated with the particular channel, wherein the metadata provides a summary of future performance parameters for specific channels such that a statistical remultiplexer allocates future bandwidth in response to a video on demand function request, wherein the statistical remultiplexer is configured to receive the VOD program content in a nonlinear viewing sequence, the statistical remultiplexer being adapted to utilize the metadata to determine bandwidth allocation for the non-linear viewing sequence such that system latency is less than about one second in response to the VOD function request, and wherein the statistical remultiplexer is configured to re-encode a particular stream to meet a future bandwidth limitation.

18. The method of claim 17, wherein portions of metadata comprise a plurality of statistical descriptions relating to one of the plurality of streams.

19. The method of claim 17, further comprising acquiring a portion of metadata to determine bandwidth allocation for a portion of one of the plurality of streams.

20. The method of claim 17, wherein a portion of metadata is linked to at least one time code of one of the plurality of streams.

21. The method of claim 17, wherein a second portion of metadata is received in a separate file and linked to a second portion of the one of the plurality of streams.

22. The method of claim 17, wherein the one of the plurality of streams of program content is an encoded MPEG stream and portions of metadata are received as private data with the encoded MPEG stream.

23. An apparatus, comprising:
one or more computer processors; and
logic encoded in one or more tangible storage media for execution by the one or more computer processors, and when executed operable to:
store ten or less frames of a first portion of one of a plurality of streams of program content, wherein the first portion is linked to a first portion of metadata, wherein the metadata originated from a source of the program content, and wherein the metadata is different than subscriber metadata in the stream of VOD program content and the metadata is removed from the stream of VOD program content at a video edge distribution hub;
multiplex a plurality of variable bit rate channels into a single transport stream having a maximum bandwidth;
vary a portion of the maximum bandwidth allocated to a particular one of the channels based on information provided by the metadata associated with the particular channel, wherein the metadata provides a summary of future performance parameters for specific channels such that a statistical remultiplexer allocates future bandwidth in response to a video on demand function request, wherein the statistical remultiplexer is configured to receive the VOD program content in a nonlinear viewing sequence, the statistical remultiplexer being adapted to utilize the metadata to determine bandwidth allocation for the non-linear viewing sequence such that system latency is less than about one second in response to the VOD function request, and wherein the statistical remultiplexer is configured to re-encode a particular stream to meet a future bandwidth limitation.

24. The apparatus of claim 23, wherein portions of metadata comprise a plurality of statistical descriptions relating to one of the plurality of streams.

25. The apparatus of claim 23, wherein the logic when executed is further operable to acquire a portion of metadata to determine bandwidth allocation for one of the plurality of streams.

26. The apparatus of claim 23, wherein a portion of metadata is linked to at least one time code in one of the plurality of streams.

27. The apparatus of claim 23, wherein a portion of metadata is received prior to receiving a linked portion of one of the plurality of streams.

28. The apparatus of claim 23, wherein a portion of metadata is received in a separate file and linked to a portion of the plurality of streams.

29. The apparatus of claim 23, wherein one of the plurality of streams of program content is an encoded MPEG stream and portions of metadata are received as private data with the encoded MPEG stream.

30. The statistical remultiplexer of claim 1, wherein the metadata uses time codes to identify video frames in the stream of VOD program content that the metadata relates to and the metadata describes a bandwidth requirement between two time codes.

31. The statistical remultiplexer of claim 1, wherein the metadata includes a flag that indicates a portion of the stream of VOD program content is a low value advertisement stream.

32. The statistical remultiplexer of claim 1, wherein the metadata does not include subscriber metadata.

33. The statistical remultiplexer of claim 1, wherein the metadata includes frame size, type of picture, quantizer levels, and picture complexity.

34. The statistical remultiplexer of claim 1, wherein a single frame is stored in a buffer for receiving the stream of VOD program content while four or less frames are stored in a look ahead buffer for a second stream that is not a stream of VOD program content.

* * * * *